US009213925B2

(12) United States Patent
Tadokoro et al.

(10) Patent No.: US 9,213,925 B2
(45) Date of Patent: Dec. 15, 2015

(54) INFORMATION PROCESSING APPARATUS, CONTROL METHOD, AND COMPUTER-READABLE STORAGE MEDIUM FOR INSTRUCTING PRINTING TO A PRINTING APPARATUS

(75) Inventors: Yoshihisa Tadokoro, Machida (JP); Yousuke Ito, Kawasaki (JP); Yuji Kojima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 478 days.

(21) Appl. No.: 13/296,543

(22) Filed: Nov. 15, 2011

(65) Prior Publication Data
US 2012/0133976 A1 May 31, 2012

(30) Foreign Application Priority Data
Nov. 30, 2010 (JP) .................................. 2010-267504

(51) Int. Cl.
*G06K 15/00* (2006.01)
*G06F 3/12* (2006.01)

(52) U.S. Cl.
CPC ............ *G06K 15/402* (2013.01); *G06F 3/1207* (2013.01); *G06F 3/127* (2013.01); *G06F 3/1259* (2013.01); *G06F 3/1285* (2013.01)

(58) Field of Classification Search
USPC ........................................................ 358/1.15
See application file for complete search history.

(56) References Cited

U.S. PATENT DOCUMENTS

| 6,373,585 B1 * | 4/2002 | Mastie et al. ................. 358/1.15 |
| 2007/0086038 A1 * | 4/2007 | Matsuzaki .................... 358/1.13 |
| 2008/0266594 A1 * | 10/2008 | Lankreijer et al. ........... 358/1.15 |
| 2011/0222116 A1 * | 9/2011 | Tomita ......................... 358/1.15 |
| 2011/0317209 A1 * | 12/2011 | Uchida ......................... 358/1.15 |

FOREIGN PATENT DOCUMENTS

| JP | 2001-056776 A | 2/2001 |
| JP | 2006-222661 A | 8/2006 |
| JP | 2010-204953 A | 9/2010 |

OTHER PUBLICATIONS

Japanese Office Action dated Oct. 9, 2012 issued in corresponding application No. 2010-267504.

* cited by examiner

*Primary Examiner* — Ming Hon
(74) *Attorney, Agent, or Firm* — Carter, DeLuca, Farrell & Schmidt, LLP

(57) ABSTRACT

An information processing apparatus including a hot folder, comprises: a first determination unit configured to determine whether print processing of the job data stored in the hot folder is executable; a printing unit configured to print the job data determined to be executable; a second determination unit configured to determine whether the printing unit has normally ended the print processing of the job data; a specifying unit configured to specify outline information of a status of the print processing of the job data; an acquisition unit configured to acquire detailed information of the status of the print processing of the job data; and a creation unit configured to create a printing status notification file including the outline information of the status of the print processing of the job data specified and the detailed information of the status of the print processing of the job data acquired.

9 Claims, 6 Drawing Sheets

FIG. 5

| 601 | 602 | 603 |
|---|---|---|
| SERIAL NUMBERS | EXTENSION | PROCESSING STATUS |
| 1 | prc | PROCESSING |
| 2 | ok | NORMAL END |
| 3 | err | ERROR |
| 4 | | |

FIG. 6

| | | |
|---|---|---|
| 701 | JOB NAME | ENTERED JOB FOLDER NAME OR PRINT CONTENT DATA NAME |
| 702 | ENTRY RECEPTION TIME | TIME HOT FOLDER MONITORING UNIT HAS TRANSFERRED JOB TO HOT FOLDER CONTROL UNIT |
| 703 | JOB IDENTIFIER | ID TO UNIQUELY IDENTIFY JOB |
| 704 | PRINT END TIME | TIME PRINTING OF JOB HAS ENDED OR TIME JOB PROCESSING HAS ENDED DUE TO SOME REASON |
| 705 | PATH TO ENDED JOB DATA | FOLDER PATH TO STORAGE LOCATION OF ENDED JOB DATA |
| 706 | ERROR CAUSE | CAUSE OF SOME ERROR THAT HAS OCCURRED |

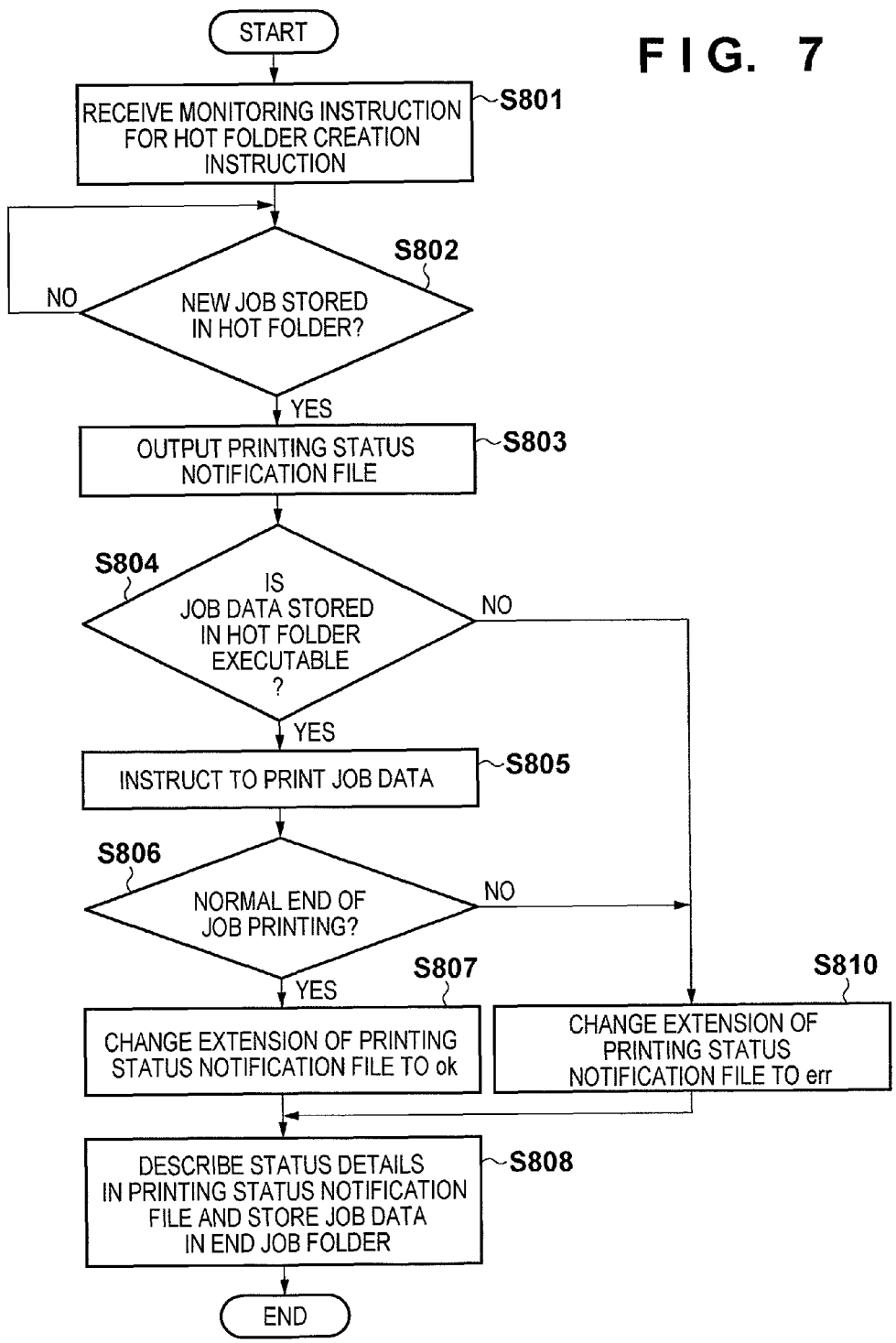
F I G. 7

INFORMATION PROCESSING APPARATUS, CONTROL METHOD, AND COMPUTER-READABLE STORAGE MEDIUM FOR INSTRUCTING PRINTING TO A PRINTING APPARATUS

BACKGROUND OF THE INVENTION

1. Field of the Invention

The present invention relates to an information processing apparatus, a control method, and a computer-readable storage medium and, more particularly, to a method for notifying a user of a processing result when executing job data using a hot folder.

2. Description of the Related Art

A photo processing system is known as a system for printing taken photos, which receives image data to be printed and performs print processing using the image data to create photo prints for an album or the like. When image data to be printed is designated, the image data and a setting information file are stored in a folder called a hot folder. The "hot folder" is set in a mass storage device such as a hard disk to store image data to be processed. Conventionally, a folder monitoring function is provided for the hot folder to detect new data stored in it and perform predetermined processing for the data.

When used from another system such as a photo processing system, the hot folder can implement a printing function by simply entering an image file to the folder without using any special API, unlike a normal printing application. This convenience of cooperation with another system is the key feature of the hot folder. In a general hot folder application, the user (client application or operator) uses the management UI of the hot folder application to confirm the status of a job entered to the hot folder application.

A hot folder application proposed in Japanese Patent Laid-Open No. 2006-222661 expresses the status of a job using an extension added to the folder name of the job folder stored in the hot folder. Detailed information about the job is written in a file created in the job folder to represent the details of the job status.

However, this related art has the following problems. In the general hot folder application, the user needs to confirm the job status on the management UI of the hot folder application. For this reason, the operator needs to know the operation procedure of the management UI to confirm the status of a job entered to the hot folder. That is, the operator is forced to master the UI operation. In addition, a program that enters a job to the hot folder cannot refer to the management UI.

The hot folder application of Japanese Patent Laid-Open No. 2006-222661 creates the file representing the details of the job status under the job folder arranged in the hot folder. Hence, the client application or operator that uses the hot folder application needs to refer to the file representing the details of the status in the job folder after the change of the hot folder name has been detected.

SUMMARY OF THE INVENTION

In order to solve the above-described problems, the present invention allows a user to grasp the outline of processing only by confirming the name of a file that describes processing result information and also grasp detailed information of the processing result by confirming the contents of the file.

According to one aspect of the present invention, there is provided an information processing apparatus including a hot folder, comprising: a monitoring unit configured to monitor storage of job data in the hot folder; a first determination unit configured to determine whether print processing of the job data stored in the hot folder is executable; a printing unit configured to print the job data determined to be executable by the first determination unit; a second determination unit configured to determine whether the printing unit has normally ended the print processing of the job data; a specifying unit configured to specify outline information of a status of the print processing of the job data from results of the first determination unit and the second determination unit; an acquisition unit configured to acquire detailed information of the status of the print processing of the job data; and a creation unit configured to create a printing status notification file including the outline information of the status of the print processing of the job data specified by the specifying unit and the detailed information of the status of the print processing of the job data acquired by the acquisition unit.

According to another aspect of the present invention, there is provided an information processing apparatus including a hot folder, comprising: a monitoring unit configured to monitor storage of job data in the hot folder; a first determination unit configured to determine whether predetermined processing of the job data stored in the hot folder is executable; an execution unit configured to execute the predetermined processing of the job data determined to be executable by the first determination unit; a second determination unit configured to determine whether the execution unit has normally ended the processing of the job data; a specifying unit configured to specify outline information of a status of the processing of the job data from results of the first determination unit and the second determination unit; an acquisition unit configured to acquire detailed information of the status of the processing of the job data; and a creation unit configured to create a notification file including the outline information of the status of the processing of the job data specified by the specifying unit and the detailed information of the status of the processing of the job data acquired by the acquisition unit.

According to another aspect of the present invention, there is provided an method of controlling an information processing apparatus including a hot folder, comprising: monitoring storage of job data in the hot folder; determining whether print processing of the job data stored in the hot folder is executable; printing the job data determined to be executable in the determining whether the print processing is executable; determining whether the print processing of the job data has normally ended in the printing the job data; specifying outline information of a status of the print processing of the job data from results in the determining whether the print processing is executable and the determining whether the print processing has normally ended; acquiring detailed information of the status of the print processing of the job data; and creating a printing status notification file including the outline information of the status of the print processing of the job data specified in the specifying the outline information and the detailed information of the status of the print processing of the job data acquired in the acquiring the detailed information.

According to another aspect of the present invention, there is provided a computer-readable storage medium storing a program that causes a computer to function as: a monitoring unit configured to monitor storage of job data in the hot folder; a first determination unit configured to determine whether print processing of the job data stored in the hot folder is executable; a printing unit configured to print the job data determined to be executable by the first determination unit; a second determination unit configured to determine whether the printing unit has normally ended the print processing of the job data; a specifying unit configured to specify outline information of a status of the print processing of the job data from results of the first determination unit and the second determination unit; an acquisition unit configured to acquire detailed information of the status of the print processing of the job data; and a creation unit configured to create a printing status notification file including the outline information of the status of the print processing of the job data specified by the specifying unit and the detailed information of the status of the print processing of the job data acquired by the acquisition unit.

According to the present invention, it is possible to notify a client application or operator that uses a hot folder application of the processing status of a job without opening the UI of the hot folder application.

Additionally, since the status outline and the status details can be known by only one file, monitoring processing of the client application that uses the hot folder application can be simplified.

Moreover, when confirming the status outline and the status details, the labor of the operator who uses the hot folder application can be reduced as compared to the related art.

Further features of the present invention will become apparent from the following description of exemplary embodiments (with reference to the attached drawings).

BRIEF DESCRIPTION OF THE DRAWINGS

FIG. 5 is a table showing the relationship between extensions and printing statuses according to the embodiment;

FIG. 6 is a table showing the structure of a printing status notification file according to the embodiment; and FIG. 7 is a flowchart concerning a printing status notification file creation operation according to the embodiment.

DESCRIPTION OF THE EMBODIMENTS

First Embodiment

The best mode for carrying out the present invention will now be described in detail with reference to the accompanying drawings.

[System Configuration]

Figure 1:
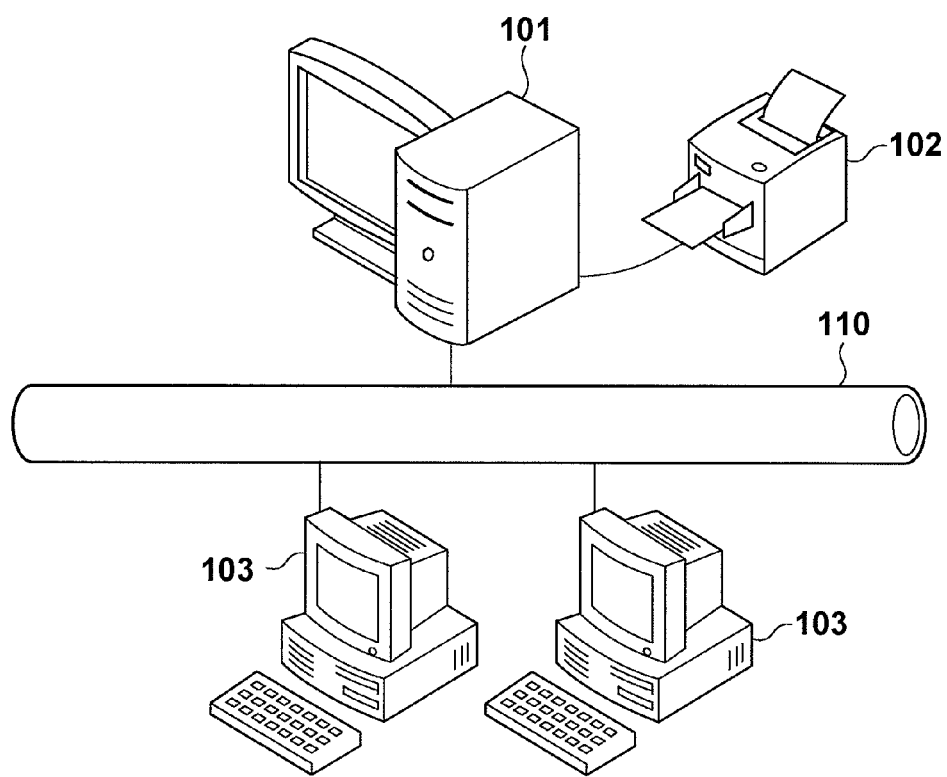
FIG. 1 is a view showing the configuration of a system according to an embodiment.

FIG. 1 is a view showing the configuration of an entire system according to an embodiment of the present invention. Referring to FIG. 1, an information processing apparatus 101 represents the information processing apparatus main body installed in a photo-developing laboratory or the like. The information processing apparatus 101 can be either a PC (Personal Computer) or a dedicated terminal, and a PC will be exemplified in this embodiment. This embodiment assumes that a hot folder is created in the information processing apparatus 101. However, the hot folder may independently be created in an external mass storage device. A printing apparatus 102 is connected to the information processing apparatus 101. Examples of the printing apparatus 102 are a laser printer, an inkjet printer, and a thermal printer. The printing apparatus 102 is used to print data entered to the hot folder.

Each PC 103 serves as a client apparatus for entering print data to the hot folder. The PC 103 can refer to the hot folder in the information processing apparatus 101 shared via a network 110. The user can cause the printing apparatus 102 to print only by storing data in the hot folder from the PC 103. The network 110 is implemented using, for example, wired or wireless LAN (Local Area Network).

Figure 2:
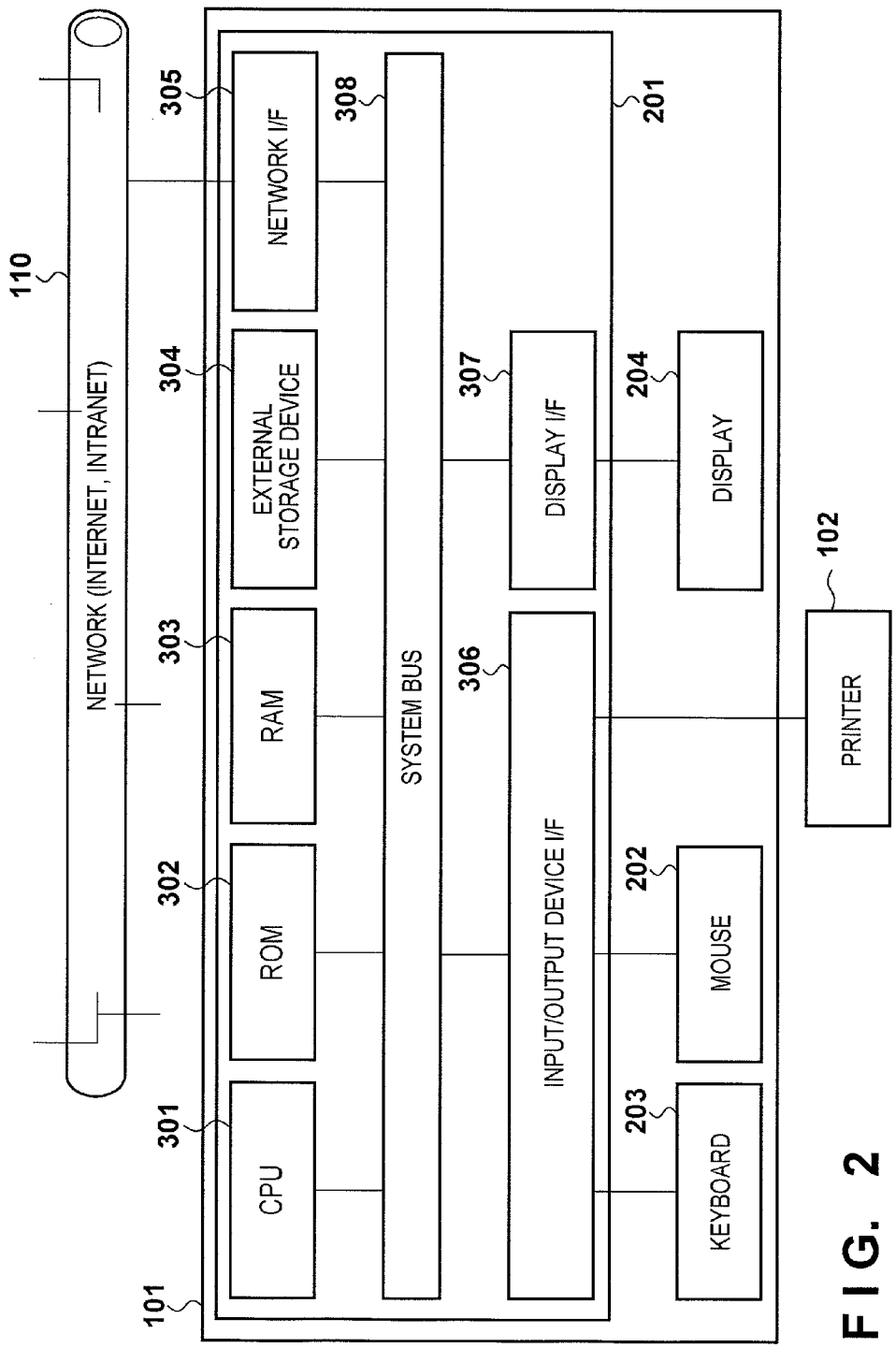
FIG. 2 is a block diagram showing the arrangement of an information processing apparatus according to the embodiment.

FIG. 2 is a block diagram showing the internal arrangement of the information processing apparatus 101 according to this embodiment. The PCs 103 also have the same parts. More specifically, the information processing apparatus 101 includes a CPU 301, a ROM 302, a RAM 303, an external storage device 304, a network I/F 305, an input/output device I/F 306, a display I/F 307, a system bus 308, a mouse 202, a keyboard 203, and a display 204.

The CPU 301 performs control processing of the entire information processing apparatus 101. For example, the CPU 301 reads out hot folder program data stored in the external storage device 304 and executes it. The ROM (Read Only Memory) 302 is a read only memory. In this embodiment, the ROM 302 can be either a PROM (Programmable ROM) that allows the user to electrically write a program or a mask ROM in which contents are written at the time of manufacture.

The RAM (Random Access Memory) 303 is freely read- and write-accessible. The RAM 303 has a function for, for example, temporarily storing data when executing the processing of the embodiment.

The external storage device 304 is a nonvolatile storage device. Examples of the external storage device 304 are an HD drive, an FD drive, an MO drive, a CD-RW drive, a DVD-RW drive, and a Blu-ray drive. The external storage device 304 stores hot folder program data and data necessary for its operation.

The network I/F 305 processes communication control for connection to a network such as an intranet. Various kinds of communication interfaces are applied in accordance with the user environment. Examples of the network I/F 305 are the interfaces of wireless LAN and Ethernet®.

The input/output device I/F 306 is used to process input/output to/from the printing apparatus 102 and the keyboard 203 or the mouse 202 provided on the information processing apparatus 101 and perform the operation and data input/output of the information processing apparatus 101. The display I/F 307 and the display 204 constitute a display unit. The display 204 is implemented using a CRT, a liquid crystal display, a plasma display, a rear projection TV, or a front projector and a control circuit thereof.

The system bus 308 performs power supply and transmission/reception of various data between the blocks in the information processing apparatus. The system bus 308 includes, for example, an address line, a data line, a control line, and power supply and ground lines.

[Program Arrangement]

Figure 3:
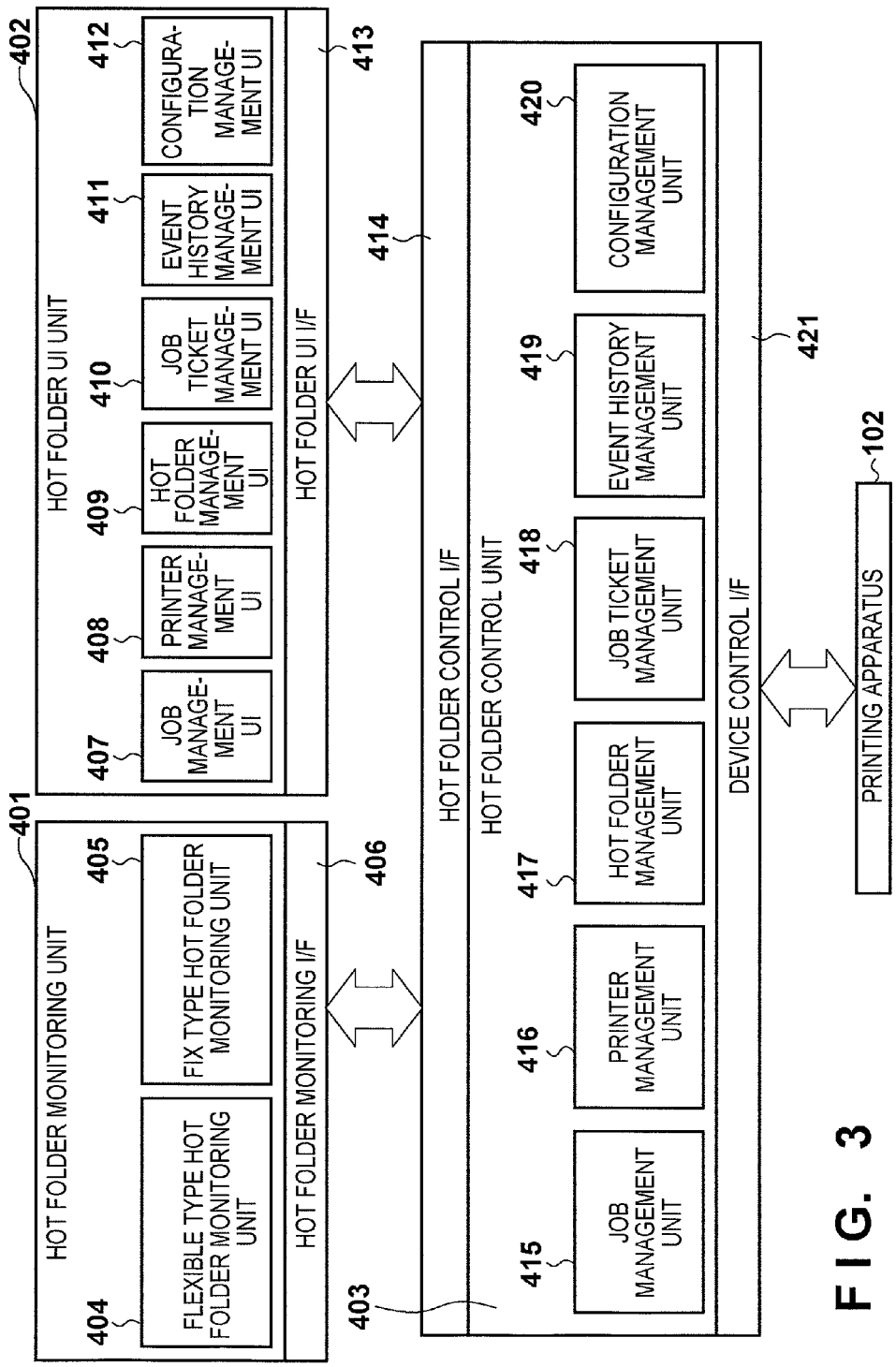
FIG. 3 is a block diagram showing an example of the arrangement of a hot folder program according to the embodiment.

FIG. 3 is a block diagram showing an example of the arrangement of the hot folder program of the information processing apparatus 101 according to this embodiment. This program runs on the information processing apparatus 101. A hot folder monitoring unit 401 monitors the hot folder and detects print data storage in it. A hot folder UI unit 402 manages information of the hot folder to be displayed on the display. A hot folder control unit 403 controls the hot folder. The hot folder program includes the hot folder monitoring unit 401, the hot folder UI unit 402, and the hot folder control unit 403.

A flexible type hot folder monitoring unit 404 monitors a flexible type folder whose settings are changeable in each printing. A fix type hot folder monitoring unit 405 monitors a folder whose settings are not changed in each printing. When a new print request is issued, it is sent to the hot folder control unit 403 via a hot folder monitoring I/F 406.

The hot folder monitoring unit 401 includes the flexible type hot folder monitoring unit 404, the fix type hot folder monitoring unit 405, and the hot folder monitoring I/F 406. A job management UI 407 serves as a UI display unit for print job management. A printer management UI 408 displays information about the printing apparatus 102 managed in the hot folder. A hot folder management UI 409 displays hot folder information under management. A job ticket management UI 410 displays print data and setting information called a job ticket to be transferred to the printing apparatus 102.

An event history management UI 411 displays the history of various kinds of event information such as print end and paper out received from the printing apparatus 102. A configuration management UI 412 serves as a display unit to display the setting information of the hot folder program. A hot folder UI I/F 413 serves as the I/F portion to the hot folder control unit 403. The hot folder UI unit 402 includes the job management UI 407, the printer management UI 408, the hot folder management UI 409, the job ticket management UI 410, the event history management UI 411, the configuration management UI 412, and the hot folder UI I/F 413.

A hot folder control I/F 414 is connected to the hot folder monitoring I/F 406 and the hot folder UI I/F 413. A job management unit 415 manages a print job. A printer management unit 416 manages the printing apparatus managed by the hot folder. A hot folder management unit 417 manages hot folder information. A job ticket management unit 418 manages a job ticket. An event history management unit 419 manages the history of various kinds of event information such as print end and paper out received from the printer.

A configuration management unit 420 manages the setting information of the hot folder program. A device control I/F 421 serves as the interface portion to the printing apparatus 102. The hot folder control unit 403 includes the hot folder control I/F 414, the job management unit 415, the printer management unit 416, the hot folder management unit 417, the job ticket management unit 418, the event history management unit 419, the configuration management unit 420, and the device control I/F 421.

[Hot Folder Structure]

Figure 4:
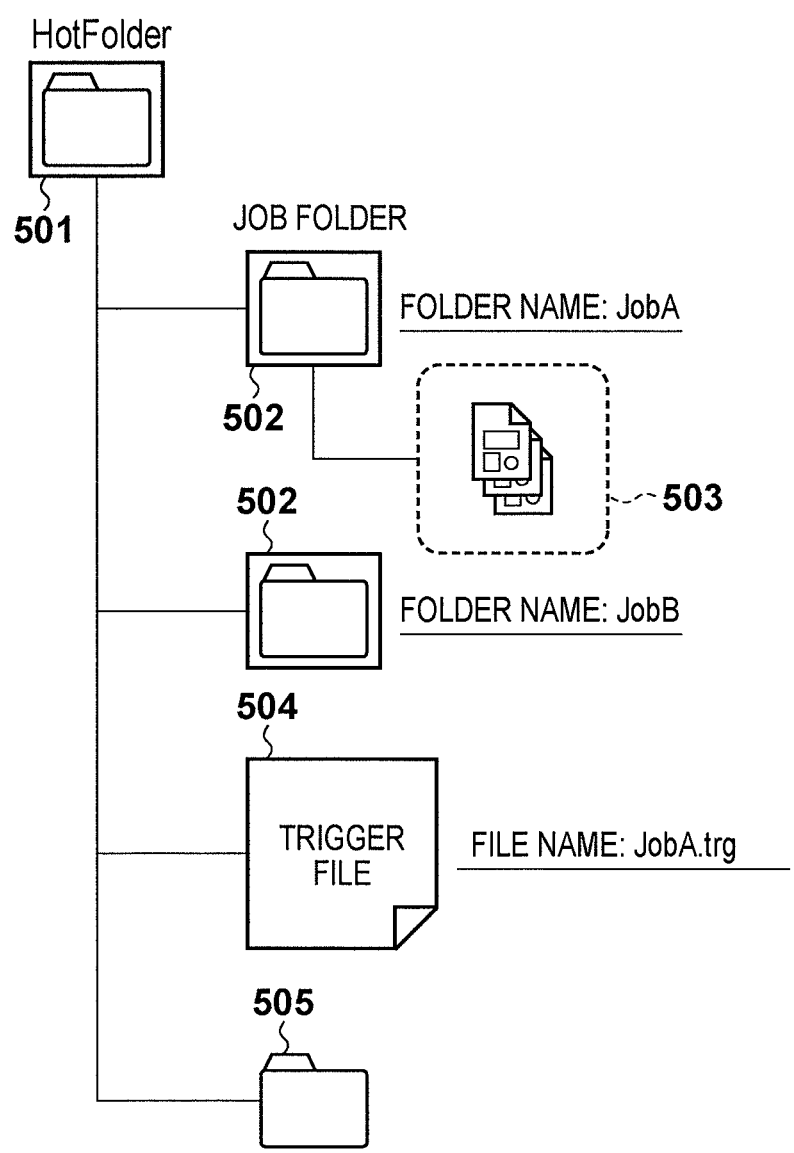
FIG. 4 is a view showing the folder/file structure of a hot folder according to the embodiment.

FIG. 4 illustrates an example of the structure of the hot folder in the information processing apparatus 101 of this embodiment. A root folder 501 is the root of the hot folder. A job folder 502 is created in the hot folder in correspondence with each job. Job data 503 is stored in the job folder 502 and includes print content data and a job ticket. A trigger file 504 is used as a trigger to start job processing. At the timing the trigger file 504 is stored immediately under the root folder 501, the print job of the job folder having the same name as that of the trigger file 504 starts. An ended job storage folder 505 stores an ended job.

[Extension Table]

In the present invention, a printing status notification file is used as a notification file including various kinds of information of a job status.

FIG. 5 illustrates an example of a table showing the names of extensions of the printing status notification file in the information processing apparatus 101 and print result outline information represented by the extensions. An item 601 represents serial numbers. An item 602 represents extensions. An item 603 represents processing statuses of a job, which have a one-to-one correspondence to the extensions of the item 602 so that the user can confirm the current progress status of the print job.

In this embodiment, the extension ".prc" indicates that the job corresponding to the printing status notification file is being processed. The extension ".ok" indicates that the job has normally ended. The extension ".err" indicates that the job processing has failed due to some error. Note that although the three extensions has been exemplified here, an extension representing another state may be added.

The information processing apparatus 101 specifies and adds the extension of the printing status notification file in accordance with the processing status of job data stored in the hot folder.

[Job Status Detailed Information]

FIG. 6 illustrates an example of a table showing the structure of the printing status notification file representing job status detailed information in the information processing apparatus of this embodiment. This embodiment assumes that the printing status notification file is described in the CSV format. However, any other format such as XML may be adopted.

An item 701 represents a job name. In this embodiment, a job folder name or a print content data name entered to the hot folder is used. An item 702 represents an entry reception time corresponding to a print start time. This is exactly the time a job has been transferred from the hot folder monitoring unit 401 to the hot folder control unit 403. An item 703 represents a job identifier that allows a job to be uniquely identified. An item 704 represents a print end time corresponding to the time printing of a job has ended or the time job processing has ended due to some reason. An item 705 represents a path to ended job data, that is, a folder path to a location where ended job is stored. An item 706 represents an error cause and describes the cause of some error that has occurred.

For a job that is being executed (extension ".prc"), the job name of the item 701, the entry reception time of the item 702, and the job identifier of the item 703 are described. For a job that has been processed (extension ".ok"), not only the above-described items but also the print end time of the item 704 and the path to the ended job data of the item 705 are described in the printing status notification file. For a job for which an error has occurred (extension ".err"), the error cause of the item 706 is also described.

Note that the pieces of information included in the printing status notification file are not limited to those described above, and more information (for example, the name of the printer that has executed processing) may be included.

[Print Processing Procedure]

FIG. 7 illustrates an example of a flowchart concerning the operation of print processing using the hot folder of the information processing apparatus 101 according to this embodiment. In this embodiment, the CPU 301 provided in the information processing apparatus 101 executes the processing by reading out a program stored in, for example, the ROM 302 serving as a storage unit.

In step S801, the hot folder monitoring unit 401 receives an instruction to monitor a hot folder creation instruction from the hot folder management unit 417 based on hot folder management information. In step S802, the hot folder monitoring unit 401 determines based on the presence/absence of the trigger file 504 whether a new job is stored in the hot folder. If the trigger file 504 is newly stored immediately under the root folder 501, the hot folder monitoring unit 401 determines that a new job is stored in the hot folder. If a new job is stored (YES in step S802), the hot folder monitoring unit 401 transfers the print job data to the hot folder control unit 403, and the process advances to step S803.

In step S803, the hot folder control unit 403 creates a printing status notification file that describes the job name, the entry reception time, and the job identifier. The hot folder control unit 403 sets the extension of the file name of the created printing status notification file to ".prc", and outputs the file to the same position as that of the trigger file 504 (in this embodiment, immediately under the root folder 501).

In step S804, the hot folder control unit 403 confirms the contents of the acquired job data. If the stored job data has no problem (YES in step S804), the process advances to step S805. Determining whether processing of the job data is executable (first determination) is done by confirming necessary items such as the presence/absence of necessary data and authority to execute. However, the contents to be confirmed are not particularly limited.

In step S805, the hot folder control unit 403 transfers the job data to the printing apparatus 102 via the device control I/F 421 and instructs printing. Note that in this embodiment, the printing apparatus is assumed to be able to interpret the print job for printing. However, print job interpretation may be done on the side of the information processing apparatus 101, and the printing processing may be executed using a printer driver or the like.

In step S806, the hot folder control unit 403 determines whether job data printing has normally ended. If the job has normally ended (YES in step S806), the hot folder control unit 403 changes the extension of the file name of the printing status notification file that is stored in the root folder 501 and corresponds to the normally ended job to ".ok" representing normal end in step S807. Note that determining whether the job has normally ended (second determination) may be done by, for example, receiving a notification from the printing apparatus at the same time as the job end. Alternatively, the information processing apparatus may periodically ask the printing apparatus about the status of the job that is the target of the execution request.

In step S808, when the job has normally ended, the hot folder control unit 403 describes the print end time and the path to the ended job data as the contents of the printing status notification file. In case of error end (NO in step S806), the hot folder control unit 403 also describes the error cause in addition to the above-mentioned information. The hot folder control unit 403 moves the data of the processed job to the ended job storage folder 505. At this time, it is possible to move either the entire job folder including the data of the job or only the data to the ended job storage folder 505. In this case, the job folder arranged in the root folder 501 is deleted. The processing procedure thus ends.

If no new job is stored in step S802 (NO in step S802), the processing waits until a job is newly added (until a new trigger file is stored). If the contents of the job data have a problem in step S804 (NO in step S804), the process advances to step S810. If the job printing has not been done normally in step S806 (NO in step S806), the process advances to step S810. In step S810, the hot folder control unit 403 changes the extension of the file name of the printing status notification file to ".err" representing an error.

The flowchart concerning print processing for the hot folder of the information processing apparatus 101 has been described above. Note that in this embodiment, a print job aiming print processing has been exemplified. However, the present invention is not limited to print processing and is also applicable when performing predefined image processing by managing and controlling a job using the hot folder. For example, the present invention is usable when applying predetermined image processing to image data stored in the hot folder as well.

As described above, according to the embodiment, the hot folder user can easily confirm the current print job status only by checking the extension of the printing status notification file. In addition, detailed information of the print job can be acquired by opening the printing status notification file and confirming its contents.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-267504, filed Nov. 30, 2010, which is hereby incorporated by reference herein in its entirety.

What is claimed is:

1. An information processing apparatus which instructs printing to a printing apparatus based on job data inputted in a folder, the apparatus comprising:
    a first determination unit configured to determine whether or not the job data is executable;
    a second determination unit configured to determine whether or not a process for the job data ends normally;
    a generation unit configured to generate, in the folder, a notification file to which an extension indicating a processing status of the job data is added; and
    a description unit configured to describe a status in the notification file,
    wherein if the first determination unit determines that the job data is not executable or the second determination unit determines that the process for the job data ends as an error end, the generation unit generates the notification file to which an extension indicating an error is added within the folder, and
    wherein the description unit describes an error cause in the notification file to which the extension indicating the error is added.

2. The information processing apparatus according to claim 1, further comprising a processing unit configured to process a job of a folder having the same name as a trigger file when the trigger file is stored in the folder.

3. The information processing apparatus according to claim 1, further comprising a moving unit configured to move the job data to an end job folder after the process for the job data has ended.

4. The information processing apparatus according to claim 3, wherein the generation unit describes, in the notification file, a path of job data of the end job folder.

5. A method of controlling an information processing apparatus including job data inputted in a folder, the method comprising:
    determining whether or not the job data is executable;
    determining whether or not a process for the job data ends normally;
    generating, in the folder, a notification file to which an extension indicating a processing status of the job data is added; and describing a status in the notification file,
wherein if it is determined that the job data is not executable or it is determined that the process for the job data ends as an error end, in the generating, the notification file to which an extension indicating an error is added is generated within the folder, and
wherein in the describing, an error cause is described in the notification file to which the extension indicating the error is added.

6. The method according to claim 5, further comprising processing a job of a folder having the same name as a trigger file when the trigger file is stored in the folder.

7. The method according to claim 5, further comprising moving the job data to an end job folder after the process for the job data has ended.

8. The method according to claim 7, wherein the generating the file includes describing, in the notification file, a path of job data of the end job folder.

9. A non-transitory computer-readable recording medium storing a computer program for causing a computer to perform a method for controlling an information processing apparatus including job data inputted in a folder, the method comprising:
   determining whether or not the job data is executable;
   determining whether or not a process for the job data ends normally;
   generating, in the folder, a notification file to which an extension indicating a processing status of the job data is added; and
   describing a status in the notification file,
   wherein if it is determined that the job data is not executable or it is determined that the process for the job data ends as an error end, in the generating, the notification file to which an extension indicating an error is added is generated within the folder, and
   wherein in the describing, an error cause is described in the notification file to which the extension indicating the error is added.

* * * * *